(12) United States Patent
Sakurai et al.

(10) Patent No.: US 9,313,651 B2
(45) Date of Patent: Apr. 12, 2016

(54) MEMORY SYSTEM AND METHOD OF CONTROLLING MEMORY SYSTEM

(71) Applicant: Kabushiki Kaisha Toshiba, Minato-ku (JP)

(72) Inventors: Shuichi Sakurai, Yokohama (JP); Ryuichi Kitajima, Funabashi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/475,831

(22) Filed: Sep. 3, 2014

(65) Prior Publication Data

US 2015/0373534 A1 Dec. 24, 2015

Related U.S. Application Data

(60) Provisional application No. 62/014,484, filed on Jun. 19, 2014.

(51) Int. Cl.
*G06F 13/00* (2006.01)
*H04W 8/22* (2009.01)
*H04W 4/00* (2009.01)

(52) U.S. Cl.
CPC .............. *H04W 8/22* (2013.01); *H04W 4/003* (2013.01); *H04W 4/008* (2013.01)

(58) Field of Classification Search
USPC .................. 711/103, 101; 713/1; 235/492
See application file for complete search history.

(56) References Cited

U.S. PATENT DOCUMENTS

| 8,307,143 | B2 | 11/2012 | Hirayama et al. | |
|---|---|---|---|---|
| 8,606,711 | B2 | 12/2013 | Florek et al. | |
| 2008/0016296 | A1* | 1/2008 | Murayama | G06F 13/4234 711/156 |
| 2008/0034259 | A1* | 2/2008 | Ko | G06F 11/1441 714/718 |
| 2012/0278536 | A1* | 11/2012 | Kato | G06F 12/1433 711/103 |
| 2013/0227206 | A1* | 8/2013 | Carannante | G06F 12/0246 711/103 |
| 2014/0051353 | A1 | 2/2014 | Nakamura | |
| 2014/0164787 | A1* | 6/2014 | Ueno | G06F 21/53 713/190 |
| 2014/0244960 | A1* | 8/2014 | Ise | G06F 3/061 711/165 |

FOREIGN PATENT DOCUMENTS

| JP | 2009-522662 | 6/2009 |
|---|---|---|
| JP | 2011-198175 | 10/2011 |
| JP | 2012-526306 | 10/2012 |
| JP | 5260031 | 8/2013 |
| JP | 2013-178758 | 9/2013 |
| WO | WO 2007/076456 A2 | 7/2007 |
| WO | WO 2010/128442 A2 | 11/2010 |

* cited by examiner

*Primary Examiner* — Ahshik Kim
(74) *Attorney, Agent, or Firm* — Oblon, McClelland, Maier & Neustadt, L.L.P.

(57) ABSTRACT

According to an embodiment, a memory device includes a nonvolatile first memory, a nonvolatile second memory, a first controller, and a second controller. The first controller is configured to write, to the first memory, data received over a short-range radio communication by using power generated in the short-range radio communication. The second controller is configured to execute, at a startup of the memory device, a transfer process of reading a file written in the first memory and storing the read file to the second memory.

18 Claims, 3 Drawing Sheets

| FILE NAME | |
|---|---|
| DATA | |

US 9,313,651 B2

MEMORY SYSTEM AND METHOD OF CONTROLLING MEMORY SYSTEM

CROSS-REFERENCE TO RELATED APPLICATIONS

This application is based upon and claims the benefit of priority from U.S. Provisional Patent Application No. 62/014,484, filed on Jun. 19, 2014; the entire contents of which are incorporated herein by reference.

FIELD

Embodiments described herein relate generally to a memory device equipped with a short-range radio communication chip, a memory controller, and a control method of the memory device.

BACKGROUND

Memory cards are equipped with a nonvolatile memory such as a flush memory. When memory card is loaded into a card slot of a host device, the nonvolatile memory in the memory card can be accessed from the host device.

On the other hand, attention has been paid to NFC tugs including the antenna and the chip having the NFC (Near Field Communication) function. When the NFC tug is put close to the host device having the NFC function, information can be transmitted and received between the NFC tug and the host device even under the situation where the NFC tug is not supplied with the power source.

DETAILED DESCRIPTION

In general, according to the present embodiment, a memory card includes a nonvolatile first memory, a nonvolatile second memory having a larger capacity than the first memory, a first controller, and a second controller. The first controller writes, to the first memory, data received over a short-range radio communication by using the power generated in the short-range radio communication. The second controller executes, at the startup of the memory device, a transfer process of reading a file written in the first memory and storing the read file to the second memory.

Exemplary embodiments of a memory device, a memory controller, and a control method of the memory device will be described below in detail with reference to the accompanying drawings. The present invention is not limited to the following embodiments.

Figures 1, 2:
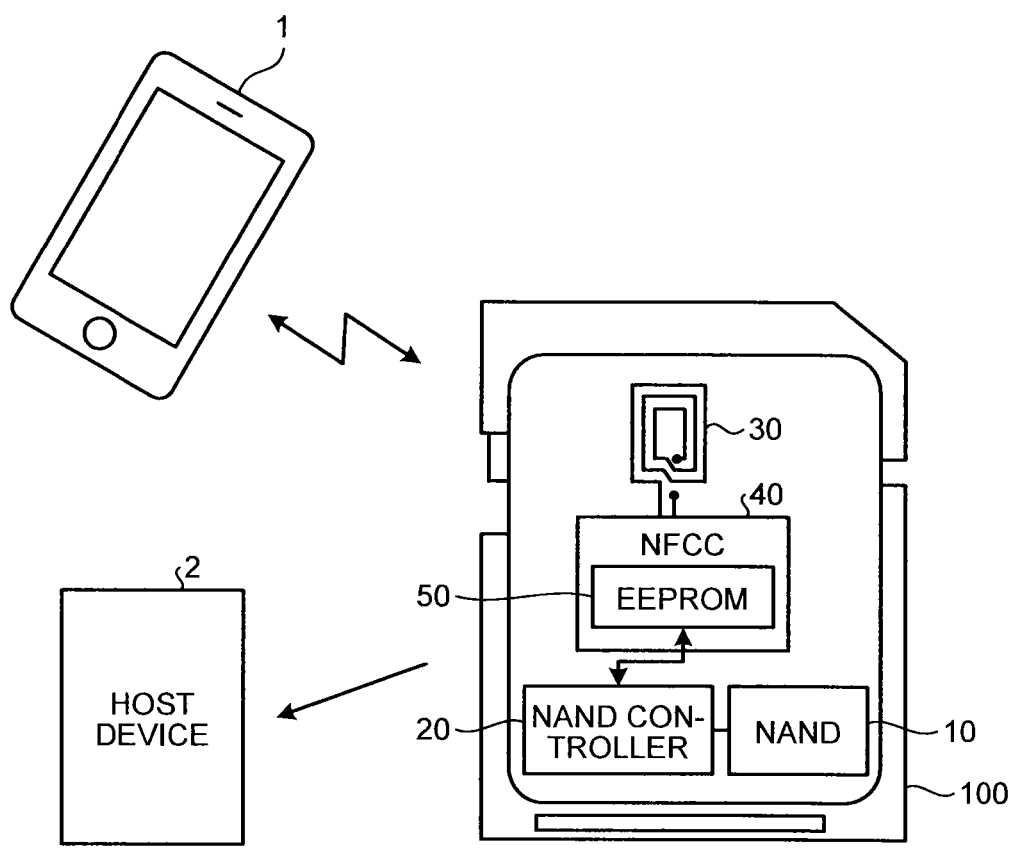
FIG. 1 is a functional block diagram illustrating an internal configuration of a memory card.
FIG. 2 is a diagram illustrating a file mapping in an EEPROM inside the memory card.

FIG. 1 is a block diagram illustrating an internal configuration example of a memory card 100 as a memory device of the embodiment. The memory card 100 has a short-range radio communication function of the NFC (Near Field Communication) standard. Other standards such as the Transfer Jet may be employed for the short-range radio communication function. The memory card 100 is made available when inserted in a card slot of a host device 2 such as a smartphone, a cellular phone, a PC (Personal Computer), or the like. The host device 2 may be a device supporting the NFC or a device not supporting the NFC. A host device 1 is a mobile terminal such as a smartphone, a cellular phone, a tablet, or the like, for example. The host device 1 is the NFC-supported device and is capable of the NFC-communication with the memory card 100. While an SD card is employed here as the memory card, other memory cards such as a USB memory, an SIM card, an IC card, and the like may be employed.

The memory card 100 includes a NAND-type flash memory (hereafter, referred to as "NAND") 10 as the nonvolatile memory, a NAND controller 20 configured to control the NAND 10, an antenna 30 supporting the NFC, an NFC controller (NFCC) 40, and a nonvolatile temporary memory 50 such as an EEPROM (Electrically Erasable Programmable Read-Only Memory).

When the memory card 100 is loaded into the host device 2, the user data designated by the host device 2 is stored in the NAND 10. The NAND 10 includes one or a plurality of memory chips. Each of the memory chips has a plurality of memory cells array in a matrix. Each of the memory cells is able to store multiple values. Each memory chip is configured by arranging a plurality of physical blocks being units of data erasing. Each of the physical blocks includes a plurality of physical pages. In the NAND 10, data write and data read are performed for each physical page.

The NAND controller 20 executes the command processing corresponding to each command received from the host device 2 when the memory card 100 is loaded into the host device 2. This command processing includes the process of reading data from the NAND 10, the process of writing data to the NAND 10, and so on. The NAND controller 20 controls the NAND 10 by using management information such as logical-physical translation information indicating the mapping of the logic address used in the host device 2 with the physical address of the NAND 10 used in the memory card 100. The NAND controller 20 executes the internal process to the NAND 10, such as the garbage collection process, the ware-leveling process, and the like in addition to the above.

The antenna 30 is an antenna for the NFC-communication, and performs transmission and reception of information with the antenna of the NFC-supported host device 1 that is put close to the memory card 100. The NFC controller 40 and the EEPROM 50 are able to operate even under the situation where the memory card 100 is not supplied with the power source. That is, in response to the action where the NFC-supported host device 1 is put close to the antenna 30 or the antenna 30 is put close to the host device 1, a magnetic field is generated from the host device 1 and the magnetic field causes an induced electromotive force to occur at the antenna 30. The induced electromotive force is utilized to operate the NFC controller 40 and the EEPROM 50.

The EEPROM 50 is a writable nonvolatile memory and is able to be accessed by the NFC controller 40 and the NAND controller 20. The data written in the EEPROM 50 can be recognized, through the NFC-communication, by the NFC-supported host device 1. Even when the memory card 100 is loaded into the card slot of the host device 2, however, the data written in the EEPROM 50 cannot be recognized by the non-NFC-supported host device 2. Any memory other than the EEPROM may be employed for a temporary memory 50 as long as it has a smaller capacity than the NAND 10, consumes less power, and is capable of the high speed access.

The NFC controller 40 performs NFC-communication with the host device 1 via the antenna 30. The NFC-communication allows the application installed in the host device 1 to write the data to the EEPROM 50 via the NFC controller 40 and read the data from the EEPROM 50. The reading/writing of the data from the application of the host device 1 to the EEPROM 50 is possible even when the memory card 100 is not inserted in the card slot and is not supplied with the power source, as described above.

FIG. 2 illustrates the mapping of the file written to the EEPROM 50 from the host device 1. The file is defined by the mapping of the file name and data. As the file name, the file name that is used in the memory card 100 is registered. A pass name can be included in the file name. The maximum size of the file name is assumed to be 256 bytes, for example. The maximum size of the data is the value obtained by subtracting the maximum size of the file name from the size of the EEPROM 50.

Figure 3:
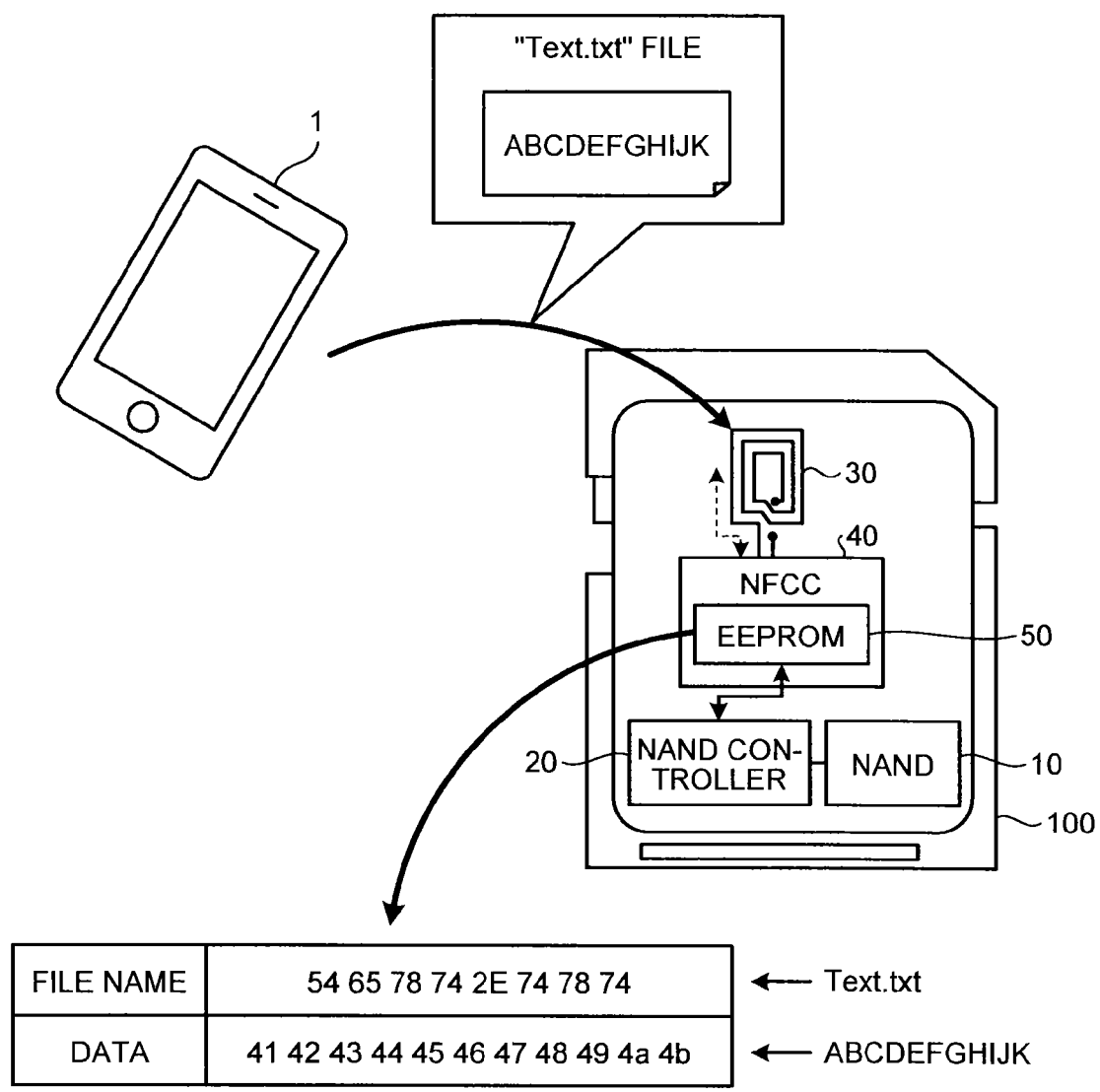
FIG. 3 is a diagram conceptually illustrating writing operation to a file by using an NFC-communication from a host device to the EEPROM of the memory card.

FIG. 3 is a diagram conceptually illustrating the operation when the file is written to the EEPROM 50 of the memory card 100 from the host device 1 by using the NFC-communication. The user of the host device 1 uses the application installed in the host device 1 to write, to the EEPROM 50, the file whose file name is, for example, "Text.txt" and data is, for example, "ABCDEFGHIJK" according to the mapping definition illustrated in FIG. 2. In the writing, the NFC-communication is executed between the host device 1 and the memory card 100 by putting the host device 1 close to the memory card 100 or putting the memory card 100 close to the host device 1. As a result, even under the situation where the memory card 100 is not supplied with the power source, the file whose file name is "Text.txt" and data is "ABCDEFGHIJK" is written to the EEPROM 50. Practically, the file name and the data are written to the EEPROM 50 by the text code such as the ASCII code.

Figure 4:
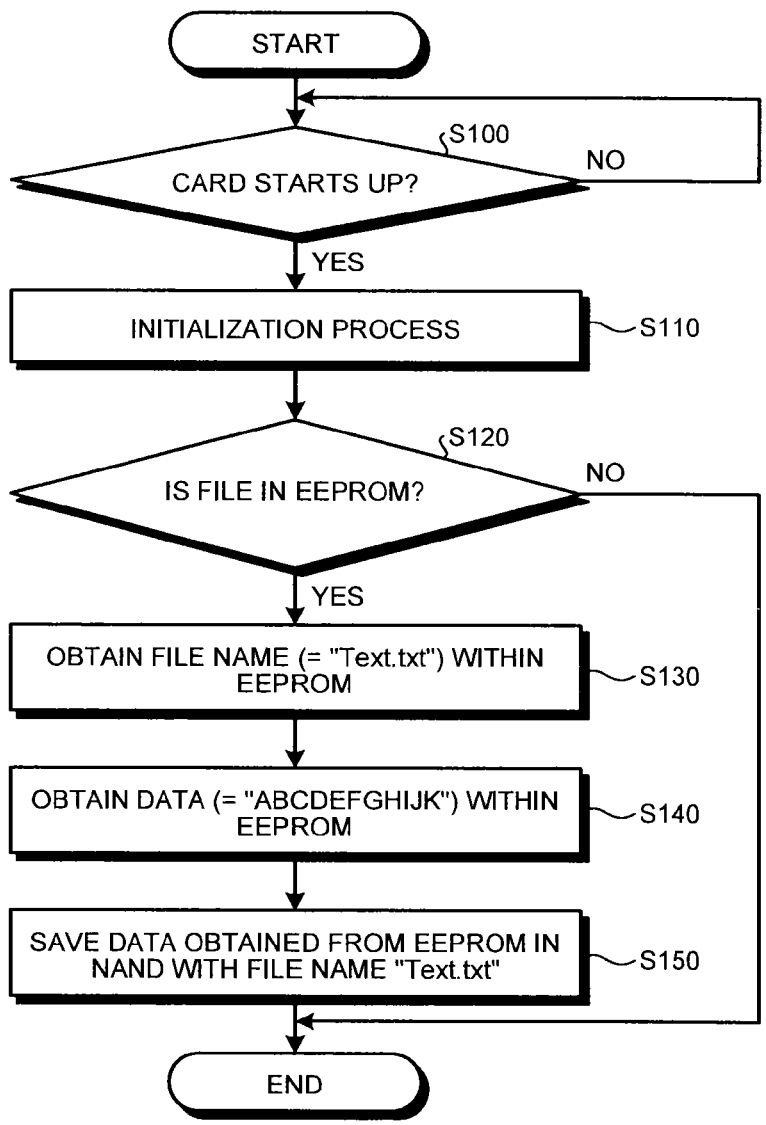
FIG. 4 is a flowchart illustrating an operation procedure at a startup of the memory card.

FIG. 4 is a flowchart illustrating the operation procedure at the startup of the memory card 100. In response to the action where the memory card 100 is inserted in the card slot of the host device 2, the memory card 100 is supplied with the power source and then starts up. In response to the startup of the memory card (step S100), the NAND controller 20 executes an initialization process including such as setting the control value for each resistor for the operation control. During this initialization process, the NAND controller 20 keeps transmitting a busy signal to the host device 2. Upon completion of the initialization process, the NAND controller 20 transmits a ready signal to the host device 2. Upon receiving the ready signal form the memory card 100, the host device 2 is able to access the file within the NAND 10.

Figure 5:
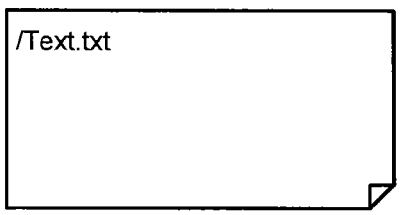
FIG. 5 is a diagram illustrating an example of a file configuration on the memory card.

Upon completion of the initialization process, the NAND controller 20 determines whether or not there is a file written in the EEPROM 50 (step S120) and, if not, terminates the startup process performed at the startup. When having detected a file in the EEPROM 50, the NAND controller 20 reads the file name from the EEPROM 50 (step S130) and further reads the data (step S140). Furthermore, the NAND controller 20 maps the data read from the EEPROM 50 to the file name read from the EEPROM 50 and writes the mapped data to the NAND 10. Further, in response to the writing to the NAND 10, the management information of the NAND 10 is updated. As a result, the file whose file name is "Text.txt" is created on the route directory of the memory card 100, as illustrated in FIG. 5. As a result, the file system of the host device 2 is able to recognize the data on the EEPROM 50 obtained by the NFC-communication.

It is noted that, the operation procedure of steps S120 to S150 may be performed during the initialization process. For example, the operation procedure of the steps S120 to S150 is performed at the final step of the initialization process. Therefore, in this case, the NAND controller 20 transmits the ready signal to the host device 2 after terminating the operation procedure of steps S120 to S150. In this case, from the first step in which the access to the memory card 100 becomes available, the host device 2 is able to identify the file transferred from the EEPROM 50 to the NAND 10.

As described above, in the embodiments, the file written to the EEPROM 50 over the NFC-communication is transferred and stored, to the NAND 10 that is the storage of the memory card, in the form of the file at the startup of the memory card. Therefore, the file obtained by the NFC-communication can be stored in the storage of the memory card without requiring any special operation. Further, even under the situation where no card slot is provided, the data can be temporarily written to the memory card over the NFC-communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   a nonvolatile first memory;
   a nonvolatile second memory having a larger capacity than the first memory;
   a memory controller comprising:
      a first controller configured to write, to the first memory, a file received over a short-range radio communication by using power generated in the short-range radio communication; and
      a second controller configured to execute, at a startup of the memory device, a transfer process of reading the file written in the first memory and storing the read file to the second memory.

2. The memory device according to claim 1, wherein the second controller executes the transfer process during an initialization process in the startup of the memory device.

3. The memory device according to claim 1, wherein the second controller executes the transfer process after the initialization process in the startup of the memory device.

4. The memory device according to claim 1, wherein the short-range radio communication is an NFC.

5. The memory device according to claim 1, wherein the first memory is an EEPROM.

6. The memory device according to claim 1, wherein the second memory is a NAND-type flash memory.

7. A memory controller connected to a nonvolatile first memory and a nonvolatile second memory, the second memory having a larger capacity than the first memory, the memory controller comprising:
   a first controller configured to write, to the first memory, a file received over a short-range radio communication by using power generated in the short-range radio communication; and
   a second controller configured to execute, at a startup of the memory controller, a transfer process of reading the file written in the first memory and storing the read file to the second memory.

8. The memory controller according to claim 7, wherein the second controller executes the transfer process during an initialization process in the startup of the memory controller.

9. The memory controller according to claim 7, wherein the second controller executes the transfer process after the initialization process in the startup of the memory controller.

10. The memory controller according to claim 7, wherein the short-range radio communication is an NFC.

11. The memory controller according to claim 7, wherein the first memory is an EEPROM.

12. The memory controller according to claim 7, wherein the second memory is a NAND-type flash memory.

13. A control method of a memory device comprising a nonvolatile first memory and a nonvolatile second memory, the second memory having a larger capacity than the first memory, the method comprising:
  writing, to the first memory, a file received over a short-range radio communication by using power generated in the short-range radio communication; and
  executing, at a startup of the memory device, a transfer process of reading the file written in the first memory and storing the read file to the second memory.

14. The method according to claim 13 further comprising executing the transfer process during an initialization process in the startup of the memory device.

15. The method according to claim 13 further comprising executing the transfer process after the initialization process in the startup of the memory device.

16. The method according to claim 13, wherein the short-range radio communication is an NFC.

17. The method according to claim 13, wherein the first memory is an EEPROM.

18. The method according to claim 13, wherein the second memory is a NAND-type flash memory.

* * * * *